(12) United States Patent
Soualle et al.

(10) Patent No.: US 8,971,383 B2
(45) Date of Patent: Mar. 3, 2015

(54) GENERATING AND PROCESSING OF CDMA SIGNALS

(71) Applicants: STMicroelectronics (Research & Development) Ltd., Bucks (GB); Astrium GmbH, Taufkirchen (DE)

(72) Inventors: Francis Soualle, Munich (DE); Jean-Jacques Floch, Munich (DE); Philip Mattos, Ruardean (GB)

(73) Assignees: STMicroelectronics (Research & Development) Ltd., Marlow, Bucks (GB); Astrium GmbH, Taufkirchen (DE)

(*) Notice: Subject to any disclaimer, the term of this patent is extended or adjusted under 35 U.S.C. 154(b) by 0 days.

(21) Appl. No.: 13/974,940

(22) Filed: Aug. 23, 2013

(65) Prior Publication Data

US 2014/0056332 A1    Feb. 27, 2014

(30) Foreign Application Priority Data

Aug. 24, 2012    (EP) .................................... 12006039

(51) Int. Cl.
*H04B 1/7103* (2011.01)
*H04J 13/00* (2011.01)
*H04J 13/18* (2011.01)

(52) U.S. Cl.
CPC .......... *H04B 1/7103* (2013.01); *H04J 13/0003* (2013.01); *H04J 13/18* (2013.01); *H04J 13/004* (2013.01)
USPC .......................................... 375/146; 375/148

(58) Field of Classification Search
CPC ....... H04B 1/69; H04B 1/707; H04B 1/70735
USPC ............................................ 375/146; 342/357
See application file for complete search history.

(56) References Cited

U.S. PATENT DOCUMENTS 5,544,167 A * 8/1996 Lucas et al. ................... 370/342
5,946,345 A * 8/1999 Karlsson et al. .............. 375/150
(Continued)

FOREIGN PATENT DOCUMENTS

EP    1 724 600 A1    11/2006
WO    WO 2006/063613 A1    6/2006
WO    WO 2008/065191 A1    6/2008

OTHER PUBLICATIONS

Pal, M.et al., "A Novel Orthogonal Minimum Cross-Correlation Spreading Code in CDMA System," Emerging Trends in Robotics and Communication Technologies (Interact), 2010 International Conference On , Vol., No., pp. 80,84, Dec. 3-5, 2010.*

(Continued)

*Primary Examiner* — Daniel Washburn
*Assistant Examiner* — Berhanu Tadese
(74) *Attorney, Agent, or Firm* — Crowell & Moring LLP (57) ABSTRACT

Systems and methods for generating a CDMA signal s(t) comprising N components involves assigning to each of the N components one unique spreading sequence $a_n$ selected from a set of M spreading sequences with M≥N, modulating the symbols $d_n$ of each component on the assigned unique spreading sequence $a_n$, and combining the N symbols $d_n$ each being spread with its own unique spreading sequence $a_n$ to a CDMA signal s(t). The assigned spreading sequences $a_n$ are selected such that all selected pairs within the set of N spreading sequences are orthogonal or very close to be orthogonal so that cross-correlation components between all spreading sequences $a_n$ are close to zero or zero.

14 Claims, 5 Drawing Sheets

(56) References Cited

U.S. PATENT DOCUMENTS

| | | | | |
|---|---|---|---|---|
| 6,005,887 | A * | 12/1999 | Bottomley et al. | 375/147 |
| 6,091,761 | A * | 7/2000 | Popovic | 375/150 |
| 8,035,555 | B2 * | 10/2011 | Winkel | 342/357.395 |
| 2003/0152136 | A1 * | 8/2003 | Roman | 375/140 |
| 2004/0234017 | A1 * | 11/2004 | Tomerlin et al. | 375/354 |
| 2005/0031016 | A1 * | 2/2005 | Rosen | 375/130 |
| 2007/0058696 | A1 * | 3/2007 | Dempster et al. | 375/148 |
| 2008/0219327 | A1 * | 9/2008 | Rushanan | 375/146 |
| 2008/0246655 | A1 * | 10/2008 | Winkel | 342/357.06 |
| 2010/0054225 | A1 * | 3/2010 | Hadef et al. | 370/342 |

OTHER PUBLICATIONS

European Search Report dated Jan. 17, 2013 (five (5) pages).
"*Spread Spectrum Systems for GNSS and Wireless Communications*", Jack. K. Holmes, Artech House, ISBN-13: 978-1-59693-083-4, ISBN-10: 1-59693-083-7. Section 2.5-2.6, pp. 78-87 (2007).
"*Spread Spectrum Systems Communications Handbook*", Marvin K. Simon, Jim K. Omura, Mc Graw Hill, Inc. ISBN: 0-07-057629-7, Section 5.7 "*Direct Sequence Multiple Access Designs*", pp. 324-338 (2001).

\* cited by examiner

CDMA signal processor 20

22: $r(t) = (\sum_{n=1}^{N} e^{j\Delta\varphi}\sqrt{P_{Rx,n}}d_n(j)\sum_{i=1}^{L}a_n(t-iT_c))) + n_{th}(t)$ 24: $A_{k,In}(j) = \left[\left(\sqrt{P_{Rx,k}}d_k(j)R_{a_k,a_k}(\Delta\tau) + \sum_{\substack{n=1\\n\neq k}}^{N}\sqrt{P_{Rx,n}}d_n(j)R_{a_k,a_n}(\Delta\tau)\right) + \frac{1}{T_{int}}\int_{t_o+jT_{int}}^{t_o+(j+1)T_{int}}\tilde{n}_c(t)\times a_k(t-\Delta\tau)dt\right] \times \cos(\pi\Delta f T_{int} - \Delta\varphi) \times \mathrm{sinc}(\Delta f T_{int})$ 26: $A_{k,Quad}(j) = \left[\left(\sqrt{P_{Rx,k}}d_k(j)R_{a_k,a_k}(\Delta\tau) + \sum_{\substack{n=1\\n\neq k}}^{N}\sqrt{P_{Rx,n}}d_n(j)R_{a_k,a_n}(\Delta\tau)\right) + \frac{1}{T_{int}}\int_{t_o+jT_{int}}^{t_o+(j+1)T_{int}}\tilde{n}_s(t)\times a_k(t-\Delta\tau)dt\right] \times \sin(\pi\Delta f T_{int} - \Delta\varphi) \times \mathrm{sinc}(\Delta f T_{int})$ 28: $D_{\Pi}(j_2) = \left\{\prod_{k_1\in E_1}^{N}A_{k_1,In}(j_1)\right\}\cdot\left\{\prod_{k_2\in E_2}^{N}A_{k_2,In}(j_2)\right\} + \left\{\prod_{k_1\in E_1}^{N}A_{k_1,Quad}(j_1)\right\}\cdot\left\{\prod_{k_2\in E_2}^{N}A_{k_2,Quad}(j_2)\right\}$ 30: $D_{\Pi} = \sum_{j_2=1}^{J}D_{\Pi}(j_2)$

Channel

18: $n_{th}(t)$ & Propagation Losses

CDMA signal generator 10

16: $s(t) = (\sum_{n=1}^{N}\sqrt{P_{Tx,n}}d_n(j)\sum_{i=1}^{L}a_n(t-iT_c)))$

12: N unique spreading PRN sequences $a_n$ with length L

14: N components

13: Apply condition between symbols $\left\{\prod_{n_1\in E_1}d_{n_1}(j_1)\right\}\cdot\left\{\prod_{n_2\in E_2}d_{n_2}(j_2)\right\} = C^{st}$

GENERATING AND PROCESSING OF CDMA SIGNALS

CROSS-REFERENCE TO RELATED APPLICATIONS

The present application claims priority under 35 U.S.C. §119 to European Patent Convention Application No. 12 006 039.7-2411, filed Aug. 24, 2012, the entire disclosure of which is herein expressly incorporated by reference.

TECHNICAL FIELD

Exemplary embodiments of the present invention relate to a method for generating a CDMA (Code Division Multiple Access) signal, a method for processing a CDMA signal, a CDMA signal generator, and a CDMA signal processor.

BACKGROUND

CDMA (Code Division Multiple Access) is a technology for transmission channel access, which allows a simultaneous transmission of several signals within the same band of frequencies. CDMA is used in mobile communications and satellite transmissions, for example to transmit different payload data streams in the same frequency range from satellites of a Global Navigation Satellite System (GNSS) such as NAVSTAR-GPS or the planned European GNSS called GALILEO to users. CDMA is also used for terrestrial telecommunication networks, for example in mobile communication networks of the $3^{rd}$ generation.

The term CDMA signal as used herein designates a code-modulated signal, i.e. a signal whose symbols are modulated with a spreading sequence or spreading code, which is transmitted from a sender such as a GNSS satellite to a receiver such as a GNSS positioning system. For example, in (NAVSTAR-) GPS to each satellite an unique C/A (coarse access) code and an unique P (precision) code are assigned as spreading codes for generating and transmitting CDMA signals. When several code-modulated signals are transmitted on the same carrier, the corresponding aggregate signal is called multiplexed or interplexed CDMA signal. Each elementary CDMA signal building the multiplexed CDMA signal is called a component.

Acquisition, tracking and data demodulation of multiplexed CDMA signals require sophisticated signal processing algorithms, which are able to extract the data contained in a received CDMA signal without a loss of information. A critical factor in CDMA systems is thermal noise, which is one of the main reasons for performance degradations. Thermal noise is usually incurred by the transmission channel and active elements of the receiver front-end.

SUMMARY OF INVENTION

Exemplary embodiments of the present invention are directed to performance improvements for acquisition, tracking or data demodulation of CDMA signals.

In accordance with exemplary embodiments of the present invention the selection of symbols used for different components of a CDMA signal is constrained in order to improve the performances for acquisition, tracking or data demodulation of that signal.

The symbols belong to components, and a CDMA signal may comprise several components. N designates the number of components. A component is comparable to a channel carrying its own information by means of the symbols of the component. At each instant and to each component of the CDMA signal one unique spreading sequence is assigned, which is used for modulating the symbols of the respective component. This sequence is different for each component, which allows discrimination or isolation of this component from the other N−1 components. According to an embodiment of the invention, over time the spreading sequence used to code the symbol of a given component can be changed, as long as it is different from the other sequences used for the modulation of the symbols of the other components, and that the receiver knows the change-schedule of the spreading sequence in order to always have access to the desired symbols. In such case, a pool of M sequences, with M≥N can be used to modulate the symbols of N components over time. Several components can transmit different information with the same CDMA signal. For example, a GNSS satellite generating and transmitting a CDMA signal according to the invention can use different components for transmitting information related to different GNSS services to GNSS receivers. A GNSS receiver can then acquire, track, and demodulate the information transmitted with the different components of the received CDMA signal by using the respective spreading sequence or code.

By introducing a constraint on the transmitted symbols, the invention provides improved performance for acquisition, tracking or data demodulation of CDMA signals, by reducing the effects of the thermal noise, which are one of the main reasons for performance degradations. In accordance with exemplary embodiments of the present invention the improved performance is achieved by using the orthogonality between the different spreading sequences and the stochastic properties of the additive thermal noise to attenuate the corresponding effects at detector (for acquisition) and discriminator (for tracking and demodulation) outputs. The signal structure and related algorithms can be adapted according to the driving performance and type of application (e.g. applications requiring a fast acquisition but low bit error rate, or requiring a large data rate with low bit error rate). For example, this invention allows creating services as e.g. indoor with the current state of the art for receiver design, without increasing the complexity and costs of these receivers. Moreover, the CDMA signal can have a constant envelop (for example, use of Multiple-Phase Shift Keying modulation, M-PSK) or not (for example use of Quadrature Amplitude Modulation, QAM).

The constraint on the transmitted symbols defines that the symbols of the components are selected to fulfill a predefined condition, for example that the product of all symbols for each time instance is a constant value over a certain period of time assuming that all modulated components have the same symbol duration. For example, if binary symbols with values +1 or −1 are used, the constraint may define that the product of all symbols for each time instance is either +1 or −1, per convention, over a certain period of time.

An embodiment of the invention relates to a method for generating a CDMA signal s(t) comprising N components, wherein the method comprises the acts of assigning to each of the N components one unique spreading sequence $a_n$ selected from a set of M spreading sequences with M≥N, for example a PRN (Pseudorandom Noise) sequence, and modulating the symbols $d_n$ of each component on the assigned unique spreading sequence $a_n$, and combining the N symbols $d_n$ each being spread with its own unique spreading sequence $a_n$ to a CDMA signal s(t), wherein the assigned spreading sequences $a_n$ are selected such that all selected pairs within the set of N spreading sequences are orthogonal or very close to be orthogonal so that cross-correlation components between all spreading sequences $a_n$ are zero or close to zero: $R_{a_k a_n}(\Delta\tau) \cong 0$ with the expression for the cross-correlation being $$R_{a_k,a_n}(\Delta\tau) = \frac{1}{T_{int}} \int_0^{T_{int}} a_k(t) a_n(t - \Delta\tau) dt,$$

and wherein the symbols $d_n$ of the components are selected such that $$\left\{ \prod_{n_1 \in E_1} d_{n_1}(j_1) \right\} \cdot \left\{ \prod_{n_2 \in E_2} d_{n_2}(j_2) \right\} = C^{st}$$

and $E_1 \cup E_2 = [1, 2, \ldots, k, \ldots, N]$, wherein $C^{st}$ is defined as a constant which, for example, can be either +1 or −1 for binary symbols, wherein $E_1$ contains $N_1$ distinct integer indexes, $E_2$ contains $N_2$ distinct integer indexes, being also distinct to the $N_1$ indexes with $N_1 + N_2 = N$, and wherein $j_1$ and $j_2$ correspond to two indexes for two code epochs of duration $T_{int}$ corresponding to the symbol period $T_{symbol}$ and wherein all modulated components have the same symbol duration, $T_{symbol}$. For example, $j_1$ and $j_2$ can be identical (with $j_1 = j_2 = j$) to denote the same code epoch, j; or $j_1$ and $j_2$ can be different, with $j_1 = j$ and $j_2 = j+1$, to denote two consecutive code epochs; or $j_1$ and $j_2$ can again be different, but now with $j_1 = j$ and $j_2 = j+Q$ where Q is an integer constant to denote two code epochs separated by Q code periods.

In particular, the N symbols $d_n(j)$ of the components taken during the same epoch j (so that $j_1 = j_2 = j$), can be selected such that, $$\left( \prod_{n=1}^{N} d_n(j) \right) = C^{st},$$

where $C^{st}$ designates a constant which, for example, is either +1 or −1 for binary symbols. For this specific case, it consequently means that the condition applies only to the symbols transmitted in the same code epoch.

The spreading sequences $a_n$ may be maximum length sequences or Gold sequences for example (other well-known spreading sequences like Kasami or Weil sequences could also be proposed).

In an embodiment of the invention, an even number N of spreading sequences $a_n$ may be provided, wherein N/(2×K) symbols $d_n(j)$, taken during the same epoch j, have to be transmitted and each symbol is always modulated on (2×K) different spreading sequences such that $$\left( \prod_{n=1}^{N} d_n(j) \right) = 1,$$

wherein K=1, 2, 3, . . . and K divides N/2. Thus, the same symbol is modulated on (2×K) different spreading sequences. For example, if K=1, a symbol is modulated "pair-wise" on two different spreading sequences, and if K=2, a symbol is modulated on four different spreading sequences.

In another embodiment of the invention, a number of N spreading sequences $a_n$ may be provided and one of the N symbols $d_n(j)$, taken during the same epoch j, may transmit a "dummy" symbol $d_q(j)$ in such a way that its value is proportional to the product of the N−1 other symbols:

$$\left( \prod_{n=1}^{N} d_n(j) \right) = \left( \prod_{\substack{n=1 \\ n \neq q}}^{N} d_n(j) \right) d_q(j) = C^{st}.$$

$$d_q(j) = C^{st} \Bigg/ \left( \prod_{\substack{n=1 \\ n \neq q}}^{N} d_n(j) \right) = C^{st} \left( \prod_{\substack{n=1 \\ n \neq q}}^{N} d_n(j) \right),$$

wherein $C^{st}$ is a constant with the value +1 or −1 per convention. The last equation is possible because $C^{st}$ is a constant with the value +1 or −1 per convention. Indeed, for binary symbols (+1/−1) the constant, $C^{st}$ should take the value +1 or −1 too. Once this value is considered per convention, it can be used as a priori for the processing of the corresponding CDMA signal.

In another embodiment of the invention, an even number of N spreading sequences $a_n$ may be provided and the product of one half of the N symbols, taken at the epoch j, with another half of the N symbols taken at the next epoch (j+1) is a constant:

$$\left\{ \prod_{n_1 \in E_1} d_{n_1}(j) \right\} \cdot \left\{ \prod_{n_2 \in E_2} d_{n_2}(j+1) \right\} = C^{st}$$

and $E_1 \cup E_2 = [1, 2, \ldots, k, \ldots, N]$, wherein $C^{st}$ is defined as a constant which for example can be either +1 or −1 for binary symbols, wherein $E_1$ contains $N_1 = N/2$ distinct indexes and $E_2$ contains $N_2 = N/2$ distinct indexes, also being distinct from the $N_1$ indexes.

The method may further comprise the act of up-converting the CDMA signal s(t) from a baseband into a transmission band.

According to a further embodiment of the invention, after a certain period of time new unique spreading sequences $a_n$ can be selected from the set of M spreading sequences, the newly selected unique spreading sequences $a_n$ can be assigned to the N components, and the symbols $d_n$ of each component can be modulated on the assigned new unique spreading sequence $a_n$.

A further embodiment of the invention relates to a method for processing a CDMA signal r(t), which is generated with a method of the invention and as described above, and wherein the method for processing comprises the following steps: receiving a CDMA signal r(t) over a duration equal to J+Q spreading code periods, which corresponds to J+Q spreading code epochs, correlating the CDMA signal r(t) for the spreading code epoch of index $j_1$ with each of the $N_1$ spreading sequences and obtaining for each of the $N_1$ complex correlations an In-phase component $A_{k,In}(j_1)$ and a quadrature component $A_{k,Quad}(j_1)$, correlating the CDMA signal r(t) for the spreading code epoch of index $j_2$, wherein $j_2 = j_1 + Q$, with each of the $N_2$ spreading sequences and obtaining for each of the $N_2$ complex correlations an In-phase component $A_{K,In}(j_2)$ and a quadrature component $A_{k,Quad}(j_2)$, multiplying the $N = N_1 + N_2$, In-phase components $A_{k,In}(j_1)$ and $A_{k,In}(j_2)$ for obtaining an output of the N multiplied In-phase components $A_{k,In}(j_1)$ and $A_{k,In}(j_2)$, multiplying the $N = N_1 + N_2$ quadrature components $A_{k,Quad}(j_1)$ and $A_{k,Quad}(j_2)$ for obtaining an output of the N multiplied quadrature components $A_{k,Quad}(j_1)$ and $A_{k,Quad}(j_2)$, and summing the product of the N multiplied In-phase components $A_{k,In}(j_1)$ and $A_{k,In}(j_2)$ and the product of the N multiplied quadrature components $A_{k,Quad}(j_1)$ and $A_{k,Quad}(j_2)$ for obtaining a detector output $D_\Pi(j_2)$ corresponding to the spreading code epoch $j_2$, repeating the preceding steps for the determination of J successive $D_\Pi(j_2)$ detectors outputs corresponding to J successive index values of $j_2$, summing J successive detector outputs $D_\Pi(j_2)$ corresponding to J successive correlations of the received signal.

If the received signal was not transmitted as baseband signal, but up-converted from a baseband to a frequency domain for transmission, the receiving of a CDMA signal r(t) may comprise down-converting the received signal to a baseband for obtaining a baseband representation of the CDMA signal r(t).

The correlating of the CDMA signal r(t) over a time period corresponding to the $j^{th}$ spreading code epoch with each of the spreading sequences, $a_k$ with index k, may be performed according to the following equations:

$$A_{k,In}(j) = \begin{bmatrix} \left\{\sqrt{P_{Rx,k}}\, d_k(j)R_{a_k,a_k}(\Delta\tau) + \sum_{\substack{n=1\\n\neq k}}^{N} \sqrt{P_{Rx,n}}\, d_n(j)R_{a_k,a_n}(\Delta\tau)\right\} \times \\ \cos(\pi\Delta f T_{int} - \Delta\varphi) \times \mathrm{sinc}(\Delta f T_{int}) + \\ \frac{1}{T_{int}}\int_{t_o+j\cdot T_{int}}^{t_o+(j+1)\cdot T_{int}} \tilde{n}_c(t) \times a_k(t-\Delta\tau)\,dt \end{bmatrix}$$

$$A_{k,Quad}(j) = \begin{bmatrix} \left\{\sqrt{P_{Rx,k}}\, d_k(j)R_{a_k,a_k}(\Delta\tau) + \sum_{\substack{n=1\\n\neq k}}^{N} \sqrt{P_{Rx,n}}\, d_n(j)R_{a_k,a_n}(\Delta\tau)\right\} \times \\ \sin(\pi\Delta f T_{int} - \Delta\varphi) \times \mathrm{sinc}(\Delta f T_{int}) + \\ \frac{1}{T_{int}}\int_{t_o+j\cdot T_{int}}^{t_o+(j+1)\cdot T_{int}} \tilde{n}_s(t) \times a_k(t-\Delta\tau)\,dt \end{bmatrix}$$

wherein k represents the index of the desired component for which both correlations $A_{k,In}(j)$ and $A_{k,Quad}(j)$ are calculated, j is the index of the $j^{th}$ period of time or epoch with a duration equal to the spreading code period or equivalently to the symbol, for which both correlations $A_{k,In}$ and $A_{k,Quad}$ are calculated, t is the time variable which belongs to the time interval $t_o+j\cdot T_{int} \leq t \leq t_o+(j+1)\cdot T_{int}$ and $t_o$ is an arbitrary time origin, $P_{Rx,n}$ represents the received power of each signal component, with index n (for an M-PSK modulation all signal components have the same received power $P_{Rx, N}$; for other types of modulations, such like QAM the elementary powers $P_{Rx,n}$ can be different), $\Delta\tau$ represents the code offset between the replica and received signal, $\Delta\phi$ represents the phase offset between the replica and received signal, $\Delta f$ represents the frequency offset—Doppler—between the replica and received signal, $R_{a_k,a_k}(\Delta\tau)$ represents the Auto-Correlation Function between code $a_k$ and code $a_k$ with the expression for the auto-correlation function being $$R_{a_k,a_k}(\Delta\tau) = \frac{1}{T_{int}}\int_0^{T_{int}} a_k(t)a_k(t-\Delta\tau)\,dt,$$

$R_{a_k,a_n}(\Delta\tau)$ represents the Cross-Correlation Function between code $a_k$ and code $a_n$ with the expression for the cross-correlation function being $$R_{a_k,a_n}(\Delta\tau) = \frac{1}{T_{int}}\int_0^{T_{int}} a_k(t)a_n(t-\Delta\tau)\,dt,$$

$T_{int}$ is the coherent integration time equal to the symbol duration, $T_{symbol}$, or spreading code period, $\tilde{n}_c(t)$ and $\tilde{n}_s(t)$ represent the in-phase and quadrature components of the additive noise, wherein it is supposed that the corresponding noise components are Gaussian distributed.

According to a further embodiment of the invention, a computer program may be provided, which implements a method for generating a CDMA signal s(t) according to the invention and as described before or a method for processing a CDMA signal s(t) according to the invention and as described before. The computer program may be for example installed on a computing device with a transmitter or a receiver for CDMA signals.

According to a further embodiment of the invention, a non-transitory record carrier storing a computer program according to the invention may be provided, for example a CD-ROM, a DVD, a memory card, a diskette, or a similar data carrier suitable to store the computer program for electronic access.

A further embodiment of the invention provides a CDMA signal generator for generating a CDMA signal according to the present invention comprising assigning and modulating means for assigning to each of N components one unique spreading sequence $a_n$ selected from a set of M spreading sequences with M≥N and for modulating the symbols $d_n$ of each component on the assigned unique spreading sequence $a_n$, and combining means for combining the N symbols $d_n$ each being spread with its own unique spreading sequence $a_n$ to a CDMA signal s(t), wherein the assigning and modulating means are configured to select the assigned spreading sequences $a_n$ such that all selected pairs within the set of N spreading sequences are orthogonal or very close to be orthogonal so that cross-correlation components between all spreading sequences $a_n$ are zero or close to zero: $R_{a_k,a_n}(\Delta\tau)\approx 0$ with the expression for the cross-correlation being $$R_{a_k,a_n}(\Delta\tau) = \frac{1}{T_{int}}\int_0^{T_{int}} a_k(t)a_n(t-\Delta\tau)\,dt,$$

and wherein the CDMA signal generator is configured to select the symbols $d_n$ of the components such that $$\left\{\prod_{n_1 \in E_1} d_{n_1}(j_1)\right\} \cdot \left\{\prod_{n_2 \in E_2} d_{n_2}(j_2)\right\} = C^{st}$$

and $E_1 \cup E_2 = [1, 2, \ldots, k, \ldots, N]$, wherein $C^{st}$ is defined as a constant which, for example, can be either +1 or −1 for binary symbols, wherein $E_1$ contains $N_1$ distinct integer indexes, $E_2$ contains $N_2$ distinct integer indexes, being also distinct to the $N_1$ indexes with $N_1+N_2=N$, and wherein $j_1$ and $j_2$ correspond to two indexes for two code epochs of duration $T_{int}$ corresponding to the symbol period $T_{symbol}$, and wherein all modulated components have the same symbol duration, $T_{symbol}$. For example, $j_1$ and $j_2$ can be identical (with $j_1=j_2=j$) to denote the same code epoch, j; or $j_1$ and $j_2$ can be different, with $j_1=j$ and $j_2=j+1$, to denote two consecutive code epochs; or $j_1$ and $j_2$ can again be different, but now with $j_1=j$ and $j_2=j+Q$ where Q is an integer constant to denote two code epochs separated by Q code periods.

Particularly, the generator may be configured to select the N symbols $d_n(j)$ of the components taken during the same epoch j (so that $j_1=j_2=j$), can be selected such that, $$\left(\prod_{n=1}^{N} d_n(j)\right) = C^{st},$$

where $C^{st}$ designates a constant, which for example is either +1 or −1 for binary symbols. For this specific case, it consequently means that the condition applies only to the symbols transmitted in the same code epoch.

The generator may further comprise a memory storing a computer program of the invention implementing a method for generating a CDMA signal s(t) according to the invention and a processor being configured by the stored computer program to generate a CDMA signal s(t).

A further embodiment of the invention relates to a CDMA signal processor for processing a CDMA signal generated according to the present invention and comprising a receiver for receiving a CDMA signal r(t) over a duration equal to J+Q spreading code periods, which corresponds to J+Q spreading code epochs at least one correlator for correlating the CDMA signal r(t) for the spreading code epoch of index $j_1$ with each of the $N_1$ spreading sequences and obtaining for each of the $N_1$ complex correlations an In-phase component $A_{k,In}(j_1)$ and a quadrature component $A_{k,Quad}(j_1)$ and for correlating the CDMA signal r(t) for the spreading code epoch of index $j_2$ with $j_2=j_1+Q$ with each of the $N_2$ spreading sequences and obtaining for each of the $N_2$ complex correlations an In-phase component $A_{k,In}(j_2)$ and a quadrature component $A_{k,Quad}(j_2)$, a first multiplier for multiplying the $N=N_1+N_2$ In-phase components $A_{k,In}(j_1)$ and $A_{K,In}(j_2)$ for obtaining an output of the N multiplied In-phase components $A_{k,In}(j_1)$ and $A_{k,In}(j_2)$, a second multiplier for multiplying the $N=N_1+N_2$ quadrature components $A_{k,Quad}(J_1)$ and $A_{k,Quad}(j_2)$ for obtaining an output of the N multiplied quadrature components $A_{k,Quad}(j_1)$ and $A_{k,Quad}(j_2)$, and an adder for summing the product of the N multiplied In-phase components $A_{k,Quad}(j_1)$ and $A_{k,In}(j_2)$ and the product of the N multiplied quadrature components $A_{k,Quad}(j_1)$ and $A_{k,Quad}(j_2)$ for obtaining a detector output $D_\Pi(j_2)$ corresponding to the spreading code epoch $j_2$, wherein the processor is configured to determine J successive $D_\Pi(j_2)$ detectors outputs corresponding to J successive index values of $j_2$, and a second adder summing J successive detector outputs $D_\Pi(j_2)$ corresponding to J successive correlations of the received signal.

The CDMA signal processor may further comprise a memory storing a computer program for processing a CDMA signal s(t) according to the invention and as described above and a processor being configured by the stored computer program to process a CDMA signal r(t).

Both, the CDMA signal generator and processor may be for example implemented by one or more integrated circuits, for example a chip-set or a SoC (System on Chip). The CDMA signal processor may be integrated in a mobile device such as a mobile navigation device, a smartphone, a tablet computer, or a laptop for processing CDMA signals received from for example a GNSS such as GALILEO.

These and other aspects of the invention will be apparent from and elucidated with reference to the embodiments described hereinafter.

The invention will be described in more details hereinafter with reference to exemplary embodiments. However, the invention is not limited to these exemplary embodiments.

BRIEF DESCRIPTION OF THE DRAWINGS

FIG. 3 shows a block diagram of a CDMA signal generator according to the invention and a block diagram of a processor for processing the received CDMA signal transmitted from the generator via a transmission channel to the processor according to the invention;

applies only for symbols transmitted during the same code epoch, j, is considered.

DETAILED DESCRIPTION OF EMBODIMENTS

In the following, embodiments of algorithms according to the invention, which enable to acquire, track and demodulate with high performance CDMA signals, are described. These signals are the combination of symbols spread each with PRN sequences showing good cross-correlation characteristics (the PRN sequences are orthogonal between each other, for all delays).

It will be shown that the advantages of the corresponding algorithms are all the better that the spreading codes are orthogonal.

These new algorithms will provide either a detector for acquisition or a discriminator for tracking. In both cases, the term of $\Pi^N$ (or 'PI') detector will be applied to describe this detector.

Figure 1:
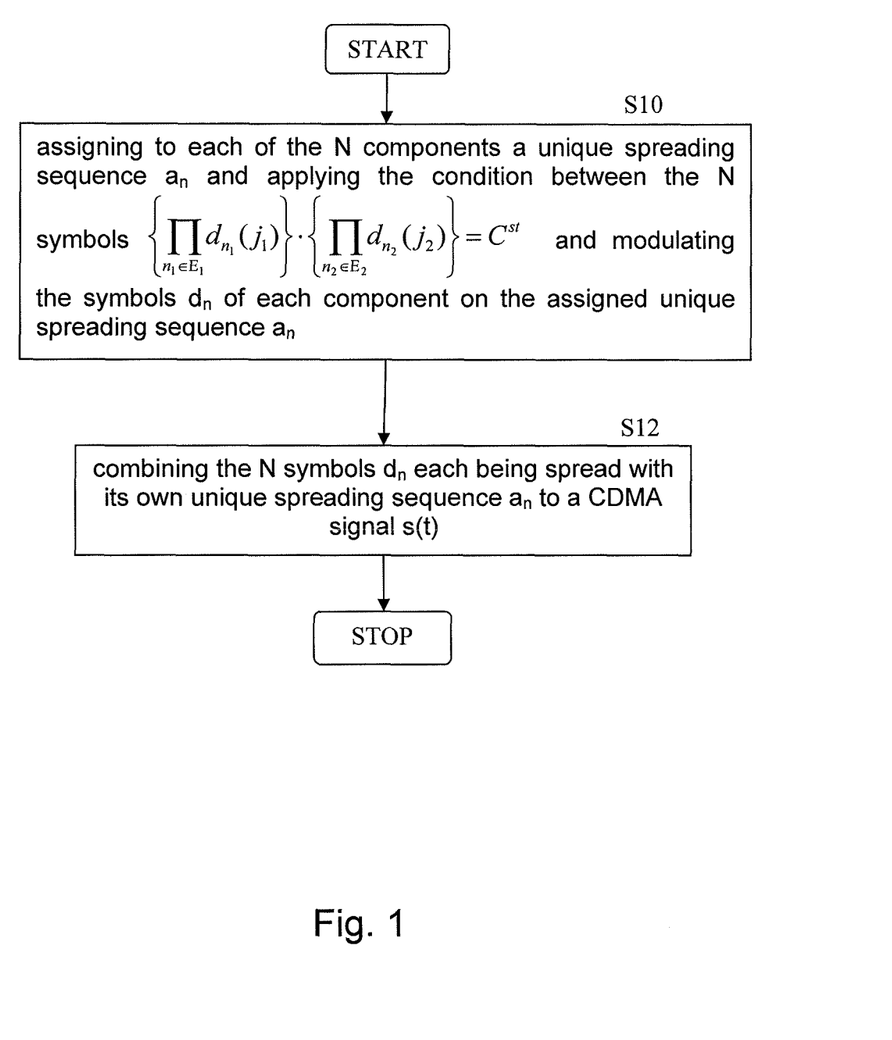
FIG. 1 shows a flowchart of an algorithm implementing a method for generating a CDMA signal s(t) according to the invention.
Figure 2:
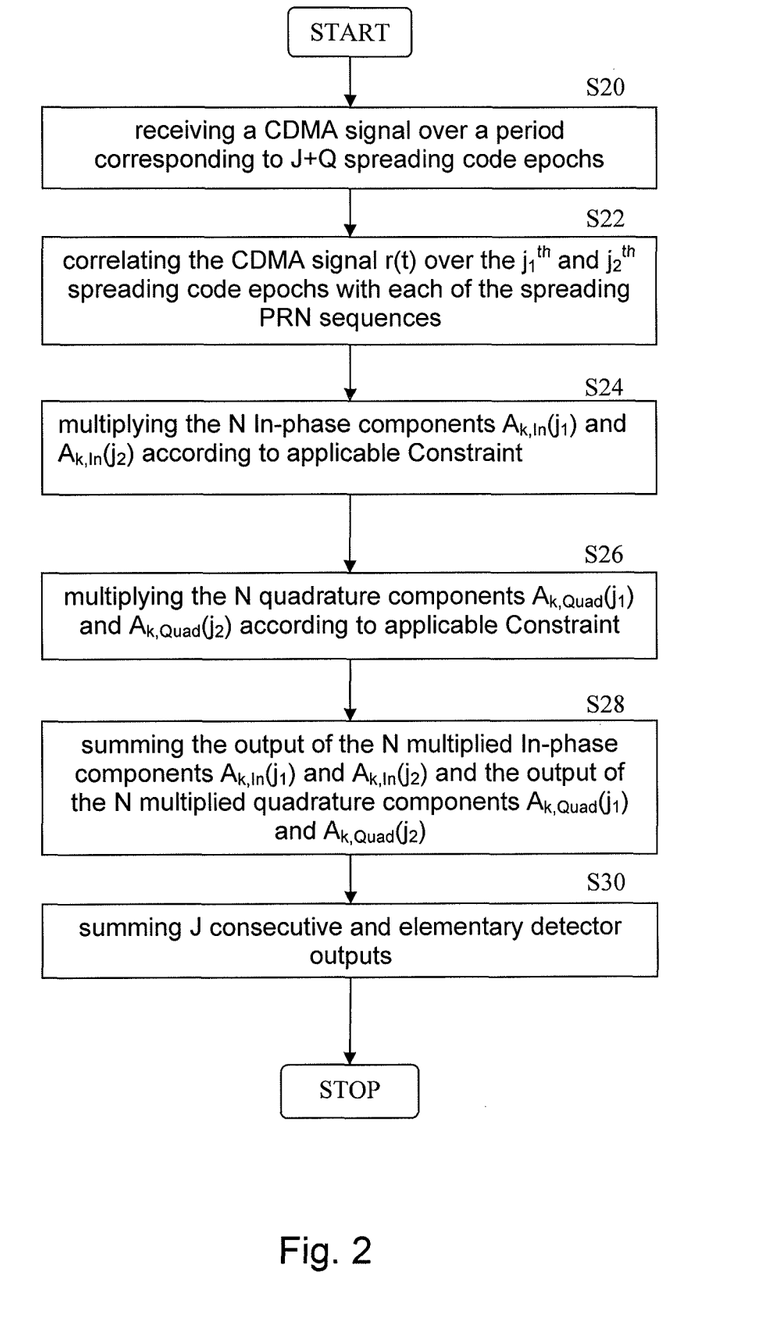
FIG. 2 shows a flowchart of an algorithm implementing a method for processing a CDMA signal r(t) according to the invention.

First, the principle underlying the present invention is explained in detail with reference to FIGS. 1-3.

At Transmission

First, the generation of a CDMA signal on the transmission side is explained. A flowchart of an algorithm for the signal generation is shown in FIG. 1: in step S10 of the algorithm, a unique spreading sequence $a_n$ is assigned to each of the components of the CDMA signal to be generated, and the N symbols $d_n$ for the N components are modulated on the assigned spreading sequences $a_n$. As constraint, the N symbols fulfill the condition $$\left\{\prod_{n_1 \in E_1} d_{n_1}(j_1)\right\} \cdot \left\{\prod_{n_2 \in E_2} d_{n_2}(j_2)\right\} = C^{st}$$

and $E_1 \cup E_2 = [1, 2, \ldots, k, \ldots, N]$. In a special case, the condition between the N symbols taken at the same code epoch j, $$\left(\prod_{n=1}^{N} d_n(j)\right) = C^{st}$$

may be applied. In a second step S12, the N symbols $d_n$ are combined to a CDMA signal s(t). The following equation provides the baseband representation of the transmitted signal, which is generated by the algorithm:

$$s(t) = \left(\sum_{n=1}^{N} \sqrt{P_{Tx,n}} \, d_n(j) \sum_{i=1}^{L} a_n(t - iT_c)\right)$$

where:
- N is the number of PRN sequences simultaneously transmitted,
- j is the index of the $j^{th}$ period of time (or epoch) with a duration equal to the spreading code period or equivalently the symbol, $T_{symbol}$,
- L is the common length for all N sequences. The chips of the $a_n(t)$ sequence have a duration $T_c$,
- $d_n(j)$ is the symbol dedicated to the component or channel of index n and to one component or channel, respectively, is allocated a particular spreading sequence, $a_n$,
- t is the time variable which belongs to the time interval $t_o + j \cdot T_{int} \le t \le t_o + (j+1) \cdot T_{int}$ where $t_o$ is an arbitrary time origin,
- $P_{Tx,n}$ represents the transmitted power per channel. For an M-PSK modulation all signal components have the same transmit power $P_{Tx, N}$. For other types of modulations, such like QAM the elementary powers $P_{Tx,n}$ can be different. The aggregate power is consequently $$\sum_{n=1}^{N} P_{Tx,n}.$$

In a specific case the same symbol can be applied to all PRN sequences.

$$s(t) = d(j)\left(\sum_{n=1}^{N} e^{j\varphi_n} \cdot \sqrt{P_{Tx,n}} \sum_{i=1}^{L} a_n(t - iT_c)\right)$$

In that particular case, the aggregate power is still $$\sum_{n=1}^{N} P_{Tx,n}$$

At Reception

In the following, the processing of a received CDMA signal r(t) is explained. It is supposed that the received signal r(t), which directly derives from s(t) after application of the propagation effects (Free Space losses, Atmospheric effects, Multipath, . . . ) is down-converted at baseband. It should be noted that for applications which use directly signals transmitted at baseband, no down conversion is of course necessary.

The corresponding baseband representation of the signal received in step S20 (FIG. 2) can be written as (ignoring multipath effects):

$$r(t) = \left(\sum_{n=1}^{N} e^{j\Delta\varphi} \cdot \sqrt{P_{Rx,n}} \, d_n(j) \sum_{i=1}^{L} a_n(t - iT_c)\right) + n_{th}(t)$$

where
- $P_{Rx,n}$ represent the received power of each signal component, n. For an M-PSK modulation all signal components have the same received power $P_{Rx, N}$. For other types of modulations, such like QAM the elementary powers $P_{Rx,n}$ can be different.
- $n_{th}(t)$ represents the additional thermal noise with double sided power spectral density $N_o/2$.
- $\Delta\phi$ represents the residual carrier phase for the signal.

Processing

The basic principle of the new proposed class of operators according to the invention comprises first correlating the received signal with each of the spreading PRN sequences $a_n$ (step S22) over a time period corresponding to the $j^{th}$ spreading code epoch. The selection of the $j^{th}$ spreading code epoch of the received signal and the PRN sequence $a_n$ is performed according to the constraint introduced at the generation of the CDMA signal, $$\left\{\prod_{n_1 \in E_1} d_{n_1}(j_1)\right\} \cdot \left\{\prod_{n_2 \in E_2} d_{n_2}(j_2)\right\} = C^{st}.$$

It means that a part $N_1$ of the N correlations will be performed with the $j_1^{th}$ spreading code epoch of the received signal, while another part $N_2$ (with $N_1 + N_2 = N$) of the N correlations will be performed with the $j_2^{th}$ spreading epoch. The indexes $j_1$ and $j_2$ for the spreading code epochs are such that $j_2 = j_1 + Q$. For each correlation, the in- and quadrature components of the corresponding correlator output, evaluated for the $j^{th}$ time (either $j_1^{th}$ or $j_2^{th}$) spreading code epoch, are given by:

$$A_{k,ln}(j) = \left[ \begin{array}{c} \left\{\sqrt{P_{Rx,k}} \, d_k(j) R_{a_k, a_k}(\Delta\tau) + \sum_{\substack{n=1 \\ n \ne k}}^{N} \sqrt{P_{Rx,n}} \, d_n(j) R_{a_k, a_n}(\Delta\tau)\right\} \times \\ \cos(\pi \Delta f T_{int} - \Delta\varphi) \times \text{sinc}(\Delta f T_{int}) + \\ \frac{1}{T_{int}} \int_{t_o + j \cdot T_{int}}^{t_o + (j+1) \cdot T_{int}} \tilde{n}_c(t) \times a_k(t - \Delta\tau) \, dt \end{array} \right]$$

-continued $$A_{k,Quad}(j) = \left[ \begin{array}{c} \left\{ \sqrt{P_{Rx,k}}\, d_k(j) R_{a_k,a_k}(\Delta\tau) + \sum_{\substack{n=1 \\ n \neq k}}^{N} \sqrt{P_{Rx,n}}\, d_n(j) R_{a_k,a_n}(\Delta\tau) \right\} \times \\ \sin(\pi \Delta f T_{int} - \Delta\varphi) \times \mathrm{sinc}(\Delta f T_{int}) + \\ \dfrac{1}{T_{int}} \int_{t_o + j \cdot T_{int}}^{t_o + (j+1) \cdot T_{int}} \tilde{n}_s(t) \times a_k(t - \Delta\tau)\, dt \end{array} \right]$$

where:
- k represents the index of the desired component for which both correlations $A_{k,In}(j)$ and $A_{k,Quad}(j)$ are calculated,
- j is the index of the $j^{th}$ period of time (or epoch) with a duration equal to the spreading code period or equivalently the symbol, for which both correlations $A_{k,In}$ and $A_{k,Quad}$ are calculated,
- t is the time variable which belongs to the time interval $t_o + j \cdot T_{int} \leq t \leq t_o + (j+1) \cdot T_{int}$ and $t_o$ is an arbitrary time origin,
- $P_{Rx,n}$ represents the received power of each signal component, with index n (for an M-PSK modulation all signal components have the same received power $P_{Rx,N}$; for other types of modulations, such like QAM the elementary powers $P_{Rx,n}$ can be different),
- $\Delta\tau$ represents the code offset between the replica and received signal,
- $\Delta\phi$ represents the phase offset between the replica and received signal,
- $\Delta f$ represents the frequency offset (Doppler) between the replica and received signal,
- $R_{a_k,a_k}(\Delta\tau)$ represents the Auto-Correlation Function between code $a_k$ and code $a_k$.

Hereafter, the expression for the auto-correlation function is provided, $$R_{a_k,a_k}(\Delta\tau) = \frac{1}{T_{int}} \int_0^{T_{int}} a_k(t) a_k(t - \Delta\tau)\, dt$$

$R_{a_k,a_n}(\Delta\tau)$ represents the Cross-Correlation Function between code $a_k$ and code $a_n$.

Hereafter, the expression for the cross-correlation function is provided, $$R_{a_k,a_n}(\Delta\tau) = \frac{1}{T_{int}} \int_0^{T_{int}} a_k(t) a_n(t - \Delta\tau)\, dt$$

$T_{int}$ is the coherent integration time equal to the symbol duration or spreading code period, $\tilde{n}_c(t)$ and $\tilde{n}_s(t)$ represents the in-phase and quadrature components of the additive noise.

Here it is supposed that the corresponding variables are Gaussian distributed which is mainly the case when the filter bandwidth of the reception chain is wide enough.

By considering the specific case when the same symbol is modulating all PRN sequences:

$$A_{k,In}(j) = \left[ \begin{array}{c} d_k(j) \cdot \left\{ \sqrt{P_{Rx,k}}\, R_{a_k,a_k}(\Delta\tau) + \sum_{\substack{n=1 \\ n \neq k}}^{N} \sqrt{P_{Rx,n}}\, R_{a_k,a_n}(\Delta\tau) \right\} \times \\ \cos(\pi \Delta f T_{int} - \Delta\varphi) \times \mathrm{sinc}(\Delta f T_{int}) + \\ \dfrac{1}{T_{int}} \int_{t_o + j \cdot T_{int}}^{t_o + (j+1) \cdot T_{int}} \tilde{n}_c(t) \times a_k(t - \Delta\tau)\, dt \end{array} \right]$$

$$A_{k,Quad}(j) = \left[ \begin{array}{c} d_k(j) \cdot \left\{ \sqrt{P_{Rx,k}}\, R_{a_k,a_k}(\Delta\tau) + \sum_{\substack{n=1 \\ n \neq k}}^{N} \sqrt{P_{Rx,n}}\, R_{a_k,a_n}(\Delta\tau) \right\} \times \\ \sin(\pi \Delta f T_{int} - \Delta\varphi) \times \mathrm{sinc}(\Delta f T_{int}) + \\ \dfrac{1}{T_{int}} \int_{t_o + j \cdot T_{int}}^{t_o + (j+1) \cdot T_{int}} \tilde{n}_s(t) \times a_k(t - \Delta\tau)\, dt \end{array} \right]$$

The second step in the generation of the $D_\Pi(j_2)$ detector evaluated for the $j_2^{th}$ spreading code epoch consists in multiplying the N In-Phase correlator outputs together (steps S24, S26), and to sum the corresponding product with the product of the N Quadrature Phase correlator outputs (step S28). Here the general case when the constraint regarding the symbol values applies for symbols belonging to two different code epochs $j_1$ and $j_2$ with $j_2 = j_1 + Q$ is considered.

$$D_\Pi(j_2) = \left\{ \prod_{k_1 \in E_1}^{N} A_{k_1,In}(j_1) \right\} \cdot \left\{ \prod_{k_2 \in E_2}^{N} A_{k_2,In}(j_2) \right\} + \left\{ \prod_{k_1 \in E_1}^{N} A_{k_1,Quad}(j_1) \right\} \cdot \left\{ \prod_{k_2 \in E_2}^{N} A_{k_2,Quad}(j_2) \right\}$$

Where the combination of the ensembles $E_1$ and $E_2$ of indexes contains all integer indexes from 1 to N: $E_1 \cup E_2 = [1, 2, \ldots, k, \ldots, N]$. The detector output is thus the combination of correlator outputs corresponding to the code epochs $j_1$ and $j_2$. Since both code epochs $j_1$ and $j_2$ are such that $j_2 = j_1 + Q$, it is possible express the detector output only with index $j_2$ and therefore $D_\Pi(j_2)$.

In particular, when the constraint applicable to the symbol applies only for symbols transmitted during the same code epoch, j (with $j = j_1 = j_2$), the sum of the product of the N-In Phase correlators with the N-Quad correlators is formed.

$$D_\Pi(j) = \prod_{k=1}^{N} A_{k,In}(j) + \prod_{k=1}^{N} A_{k,Quad}(j)$$

The last step in the generation of the $D_\Pi$ detector consists in adding J successive $D_\Pi(j_2)$ detector outputs, each computed with the code epochs $j_1$ and $j_2$ such that $j_2 = j_1 + Q$, and $j_2$ varies from Q to J+Q as shown on the step (S30).

$$D_\Pi = \sum_{j_2=1}^{J} D_\Pi(j_2)$$

FIG. 3 shows a block diagram of a CDMA signal generator 10 and a block diagram of a CDMA signal processor 20 for processing the signal generated by the generator 10 and transmitted via a transmission channel 18 to the processor.

In the generator 10, assigning and modulating means 16 assign to each of the N components or channels 14 an unique spreading PRN sequence $a_n$ with length L, and modulate the symbols $d_n$ of each channel on the assigned unique spreading sequence $a_n$. A condition $$\left\{\prod_{n_1 \in E_1} d_{n_1}(j_1)\right\} \cdot \left\{\prod_{n_2 \in E_2} d_{n_2}(j_2)\right\} = C^{st}$$

and $E_1 \cup E_2 = [1, 2, \ldots, k, \ldots, N]$ (reference numeral 13) between the N symbols transmitted at each time instant by the CDMA signal is introduced. Means 16 combine the N symbols $d_n$ to a CDMA signal s(t) according to the shown formula. The CDMA signal s(t) is then transmitted via a transmission channel 18, which adds thermal noise $n_{th}(t)$ to the signal s(t) whose power is reduced by the losses for propagation between emitter and transmitter, to the processor 20. A receiver 22 of the processor 20 receives the CDMA signal $r(t)=s(t)+n_{th}(t)$. Correlators 24 and 26 correlate the CDMA signal r(t) with each of the spreading sequences and the correlator 24 obtains for each of the N correlations an In-phase component $A_{k,In}(j_1)$ or $A_{k,In}(j_2)$ according to the selected component k, and the correlator 26 obtains for each of the N correlations a quadrature component $A_{k,Quad}(j_1)$ or $A_{k,Quad}(j_2)$ according to the selected component k, which are forwarded to multipliers 28. A first multiplier (in block 28) multiplies the N In-phase components $A_{k,In}(j_1)$ and $A_{k,in}(j_2)$ for obtaining a correlator output of the N In-phase components $A_{k,In}(j_1)$ and $A_{k,in}(j_2)$ and a second multiplier (in block 28) multiplies the N quadrature components $A_{k,Quad}(j_1)$ and $A_{k,Quad}(j_2)$, for obtaining a correlator output of the N quadrature components $A_{k,Quad}(j_1)$ and $A_{k,Quad}(j_2)$. An adder (also in block 28) adds the multiplied correlator outputs of the N In-phase components $A_{k,In}(j_1)$ and $A_{k,in}(j_2)$ and the multiplied correlator outputs of the N quadrature components $A_{k,Quad}(j_1)$ and $A_{k,Quad}(j_2)$ for obtaining a detector output $D_\Pi(j_2)$. Finally J consecutive and elementary detector outputs for J consecutive spreading code epochs of the received signal, are summed (block 30).

Figure 4:
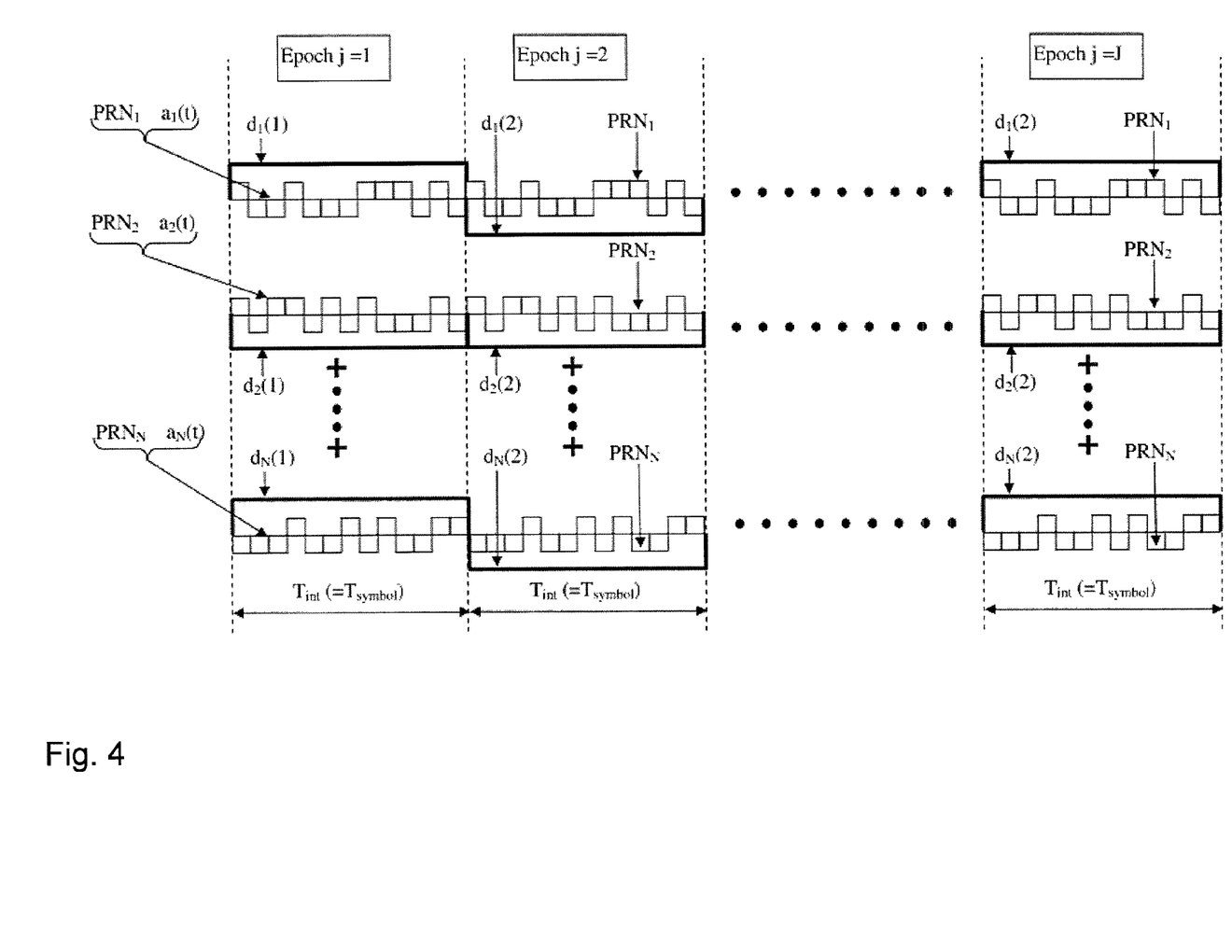
FIG. 4 shows a time diagram over several epochs of N components of a CDMA signal generated according to the invention, wherein the symbols $d_n$ of each component are modulated on its assigned unique spreading sequence $a_n$.

FIG. 4 shows a time diagram over J epochs of N components of a CDMA signal generated according to the invention. The symbols $d_1$ to $d_N$ of the N components are modulated on their assigned unique spreading sequences $a_1$ to $a_N$, respectively. Each epoch 1 to J has a duration $T_{int}$ corresponding to the symbol period $T_{symbol}$. The spreading sequences $a_1$ to $a_N$ are selected such that they are orthogonal or at least close to be orthogonal so that the cross-correlation components between the N spreading sequences $a_n$ are zero or close to zero.

Figure 5:
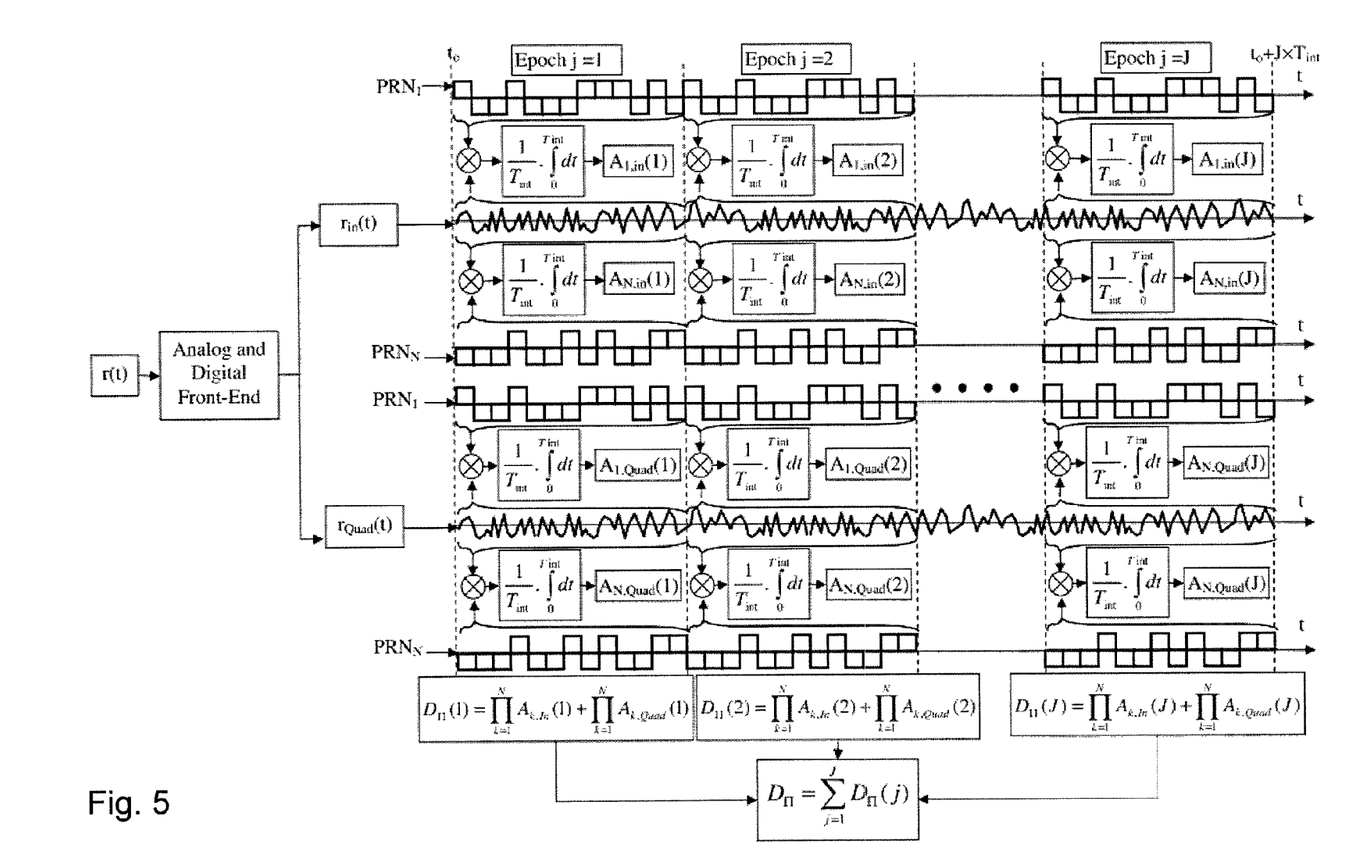
FIG. 5 shows a block diagram of a CDMA signal processor for showing the processing of a received CDMA signal generated according to the invention over several epochs. Here the particular case when the constraint $$\left(\left(\prod_{n=1}^{N} d_n(j)\right) = C^{st}\right)$$

FIG. 5 shows a block diagram of a CDMA signal processor for showing the processing of a received CDMA signal generated according to the invention over several epochs j=1 to J. In this example the following constraint $$\left(\prod_{n=1}^{N} d_n(j)\right) = C^{st}$$

between the symbols $d_n(j)$ taken at the same code epoch, j, has been applied at the signal generation. A similar block diagram can be proposed for the more general constraint, $$\left\{\prod_{n_1 \in E_1} d_{n_1}(j_1)\right\} \cdot \left\{\prod_{n_2 \in E_2} d_{n_2}(j_2)\right\} = C^{st}.$$

The processor receives signal r(t) over several epochs with an Analog and a Digital Front-End, which outputs the Quadrature component $r_{Quad}(t)$ and the In phase-component $r_{In}(t)$ for further processing. The components $r_{Quad}(t)$ and $r_{In}(t)$ are correlated for the epochs j=1 to J with the spreading sequences corresponding to the epochs. Then the N In-Phase (resp. Quadrature) correlator outputs are multiplied for each epoch j. The products for the In-phase and Quadrature components are formed and then added for each epoch j. Finally J consecutive and elementary detector outputs for J consecutive spreading code epochs of the received signal form the final detector output.

In order to show the advantage of the corresponding $\Pi^N$ operator with other more conventional operators using, for example, a matched filter approach, the deterministic contribution (the signal of interest) and the stochastic contribution (due to the thermal noise) are analyzed in the following separately.

In the following it is proposed, for purposes of illustration, to assume that all components receive the same power: $P_{Rx,n} = P_{Rx, N}$, $\forall n$ (M-PSK scenario for example). A similar approach can be applied for other types of modulation, such like QAM.

Furthermore, the particular case when the constraint $$\left(\left(\prod_{n=1}^{N} d_n(j)\right) = C^{st}\right)$$

between the symbols applies only for symbols transmitted during the same code epoch, j, is considered in this illustration.

Finally, it is proposed to consider first the evaluation of the detector output for a single spreading code epoch (J=1). Later, the advantage of cumulating J successive detector outputs will be explained (J>1).

Focus on the Deterministic Components (Noise Contribution Removed)

It can then be shown that:

$$D_\Pi(j) = \left[\prod_{k=1}^{N} \sqrt{P_{Rx,N}} \left\{d_k(j)R_{a_k,a_k}(\Delta\tau) + \sum_{\substack{n=1 \\ n \neq k}}^{N} d_n(j)R_{a_k,a_n}(\Delta\tau)\right\} \times \right.$$

$$\left. \cos(\pi \Delta f T_{int} - \Delta\varphi) \times \text{sinc}(\Delta f T_{int})\right] +$$

$$\prod_{k=1}^{N} \left[\sqrt{P_{Rx,N}} \, d(j) \left\{d_k(j)R_{a_k,a_k}(\Delta\tau) + \sum_{\substack{n=1 \\ n \neq k}}^{N} d_n(j)R_{a_k,a_n}(\Delta\tau)\right\} \times \right.$$

$$\left. \sin(\pi \Delta f T_{int} - \Delta\varphi) \times \text{sinc}(\Delta f T_{int})\right]$$

It is considered, as an illustrative case, that during the acquisition process, the hypothesis (in the Code-Doppler grid) is such that the replica and the received signals are aligned ($\Delta\tau=0$). This case corresponds to the main peak of correlation when the losses due to any code mis-alignment are zero.

Furthermore, it is supposed that the cross-correlation components between all spreading sequences $\{a_i\}$ are zero: $R_{a_k,a_n}(\Delta\tau)\cong 0$. To achieve this objective, a proper code design will have to ensure that all selected pairs (within the set of N applied spreading sequences) are orthogonal or very close to be orthogonal. As an example, the preferred pairs of a set of m (maximum length)-sequences show such required very advantageous correlation properties.

Of course, the N Auto-Correlation functions become $R_{a_k,a_k}(\Delta\tau=0)=1$.

In that case it yields.

$$D_\Pi(j) = P_N^{N/2}\left(\prod_{n=1}^{N} d_n(j)\right)$$
$$\{\cos^N(\pi\Delta fT_{int}-\Delta\varphi)+\sin^N(\pi\Delta fT_{int}-\Delta\varphi)\}\times\mathrm{sinc}^N(\Delta fT_{int})$$

Hence, it appears that the detector output is proportional to $P_N^{N/2}$.

It must be noted that if the N symbols $d_n(j)$ are independent, the detector output can be either $+P_N^{N/2}$ or $-P_N^{N/2}$ (when $\Delta f = \Delta\phi = 0$), while if some constraint exists between the corresponding symbols $$d_n(t)\left(\left(\prod_{n=1}^{N} d_n(j)\right) = C^{st}\right),$$

it is possible to always "force" the corresponding detector output to have the same sign. Forcing the sign of the detector output and consequently providing an "a priori" for the decision could improve the acquisition performance, and for example the reduction of the Probability of False Alarm in GNSS applications. For example, if the output of the detector is known a priori to be positive, all negative detector outputs can be rejected and consequently a gain of factor around 2 is achieved in the probability of False Alarm (a similar reasoning applies if the detector is known a priori to be negative: in that case all positive detector outputs could be discarded).

Here two possible solutions to "force" the detector output to have a specific sign are proposed:

Constraint 1):

If the same symbol is always modulated on two (resp. or $2\times K$) different spreading sequences, there are (N/2) (resp N/($2\times K$)) products of 1: then:

$$\left(\prod_{n=1}^{N} d_n(j)\right) = 1.$$

This supposes of course that N is even and that N/2 is dividable by K.

Constraint 2):

Another condition could consist in having N spreading sequences, and one of the channels transmits a "dummy" symbol, $d_q(j)$, in such a way that:

$$\left(\prod_{n=1}^{N} d_n(j)\right) = \left(\prod_{\substack{n=1\\n\neq q}}^{N} d_n(j)\right) d_q(j) = C^{st}.$$

$$d_q(j) = C^{st}\bigg/\left(\prod_{\substack{n=1\\n\neq q}}^{N} d_n(j)\right) = C^{st}\cdot\left(\prod_{\substack{n=1\\n\neq q}}^{N} d_n(j)\right).$$

Because the symbols are binary (+1/−1) the constant, $C^{st}$, appearing in the previous equations should take the value +1 or −1. Then it is fixed per convention (to guarantee the a priori).

The advantage with respect to the "Constraint 1" is that instead of having reduced with one half (resp. $1/(2\times K)$) the number of different symbols transmitted (and consequently the effective symbol rate), only one symbol over N is not used for data transmission (this leads to a smaller reduction of the effective symbol rate). Indeed, this symbol does not provide any useful information, since it is the product of all other symbols. In a certain sense it can be considered as sacrificed. The second advantage is that here N can be either Even or Odd.

These two solutions for the "forcing" of the detector output sign show the trade-off that exists between symbol rate (larger for the second constraint), and the Bit Error Rate (better for the first constraint since more energy would be available for the same symbol at demodulation).

By considering the specific case when the same symbol is modulating all PRN sequences, the detector output becomes:

$$D_\Pi(j)=P_N^{N/2}d^N(j)\{\cos^N(\pi\Delta fT_{int}-\Delta\phi)+\sin^N(\pi\Delta fT_{int}-\Delta\phi)\}\times\sin c^N(\Delta fT_{int})$$

If N is even, the detector output will automatically always be positive, and again it is possible to reject all negative detector outputs. This is achieved at the price of an N times lower symbol rate, but of course and N times larger energy per bit available.

Focus on the Stochastic Components

In fact the main advantage of the corresponding $\Pi^N$ operator resides in the large reduction of the stochastic contribution due to either the orthogonality between the in-phase ($n_c(t)$) or quadrature-phase ($n_s(0)$) noise components, or the orthogonality between spreading sequences either for a zero code offset ($R_{a_k,a_i}(\Delta\tau=0)=0$ or $\approx 0$) or a non-zero code offset ($R_{a_k,a_j}(\Delta\tau\neq 0)= 0$ or $\cong 0$).

The basic principle can be illustrated when considering the product of the two following integrals involving the correlation between the noise and the spreading codes:

$$\frac{1}{T_{int}}\int_0^{T_{int}}\tilde{n}_{c/s}(u)\times a_n(u-\Delta\tau)du \text{ and } \frac{1}{T_{int}}\int_0^{T_{int}}\tilde{n}_{c/s}(u)\times a_k(u-\Delta\tau)du$$

where the noise components $\tilde{n}_{c/s}(u)$ can be either the in-phase ($\tilde{n}_c(u)$) or quadrature phase ($\tilde{n}_s(u)$) components of the thermal noise, and the spreading sequence $a_n$ might or not be different to the spreading sequence $a_k$.

These two integrals correspond to the stochastic contributions that would be multiplied when considering an elementary multiplication between two correlator outputs. Since $\tilde{n}_c(u)$ and $\tilde{n}_s(u)$ are Gaussian their multiplication with a binary sequence $a_n(u)$ or $a_k(u)$ is still Gaussian, and the sum (integral) of the corresponding $a_k(u)\times\tilde{n}_c(u)$ is also Gaussian.

Hereafter the different combinations for the noise $\tilde{n}_c(u)/\tilde{n}_s(u)$ and the spreading sequences $a_n(u)/a_k(u)$ are considered:

Case 1:

Same noise contribution $\tilde{n}_c(u)$ or $\tilde{n}_s(u)$ in both integrals but two different spreading sequences $a_n(u)$ and $a_k(u)$. Here the case of $\tilde{n}_c(u)$ for both integrals is considered for illustration.

$$E\left\{\int_o^{T_{int}}\int_o^{T_{int}}\tilde{n}_c(u)a_k(u-\Delta\tau)\tilde{n}_c(v)a_n(v-\Delta\tau)dudv\right\} =$$

$$\int_o^{T_{int}}\int_o^{T_{int}}a_k(v-\tau)a_n(u-\tau)E\{\tilde{n}_c(v)\tilde{n}_c(u)\}dvdu =$$

$$\int_o^{T_{int}}\int_o^{T_{int}}a_k(v-\Delta\tau)a_n(u-\Delta\tau)\frac{N_o}{2}\delta(t-u)dvdu =$$

$$\frac{N_o}{2}\int_o^{T_{int}}\int_o^{T_{int}}a_k(v-\Delta\tau)a_n(u-\Delta\tau)\delta(v-u)dvdu =$$

$$\frac{N_o}{2}\int_o^{T_{int}}a_k(v-\Delta\tau)a_n(v-\Delta\tau)dv = \frac{N_o}{2}R_{a_k,a_n}(0)\cdot T_{int}$$

If both spreading sequences $a_n(u)$ and $a_k(u)$ are perfectly orthogonal, $R_{a_k,a_n}(0)=0$, the expectation of the product of the two previous integrals is zero.

Case 2:

Different noise contributions $\tilde{n}_c(u)$ or $\tilde{n}_s(u)$ in both integrals and same spreading sequences $a_k(u)$ equal to $a_n(u)$.

$$E\left\{\int_o^{T_{int}}\int_o^{T_{int}}\tilde{n}_c(u)a_n(u-\Delta\tau)\tilde{n}_s(v)a_n(v-\Delta\tau)dudv\right\} =$$

$$\int_o^{T_{int}}\int_o^{T_{int}}a_n(v-\tau)a_n(u-\tau)E\{\tilde{n}_c(v)\tilde{n}_s(u)\}dvdu = 0$$

Indeed, per definition the two in-phase and quadrature noise components are independent.

Case 3:

Different noise contributions $\tilde{n}_c(u)$ or $\tilde{n}_s(u)$ in both integrals and two different spreading sequences $a_n(u)$ and $a_k(u)$. This case is simply the combinations of both previous cases, and consequently the expectation of the product of the two previous integrals is zero.

Case 4:

Same noise contributions $\tilde{n}_c(u)$ or $\tilde{n}_s(u)$ in both integrals and same spreading sequences $a_k(u)$ equal to $a_n(u)$.

$$E\left\{\int_o^{T_{int}}\int_o^{T_{int}}\tilde{n}_c(u)a_n(u-\Delta\tau)\tilde{n}_c(v)a_n(v-\Delta\tau)dudv\right\} =$$

$$\int_o^{T_{int}}\int_o^{T_{int}}a_n(v-\tau)a_n(u-\tau)E\{\tilde{n}_c(v)\tilde{n}_c(u)\}dvdu =$$

$$\int_o^{T_{int}}\int_o^{T_{int}}a_n(v-\Delta\tau)a_n(u-\Delta\tau)\frac{N_o}{2}\delta(v-u)dvdu =$$

$$\frac{N_o}{2}\int_o^{T_{int}}\int_o^{T_{int}}a_n(v-\Delta\tau)a_n(u-\Delta\tau)\delta(v-u)dvdu\right\} =$$

$$\frac{N_o}{2}\int_o^{T_{int}}a_n(v-\Delta\tau)a_n(v-\Delta\tau)dt = \frac{N_o}{2}R_{a_n,a_n}(0)\cdot T_{int} = \frac{N_o}{2}\cdot T_{int}$$

Indeed the auto-correlation of the sequence $a_n(t)$, $R_{a_n,a_n}(0)$ is 1.

Hence, it can be verified that over four cases of integral multiplications, 3 of them are zero due to either the code $a_n(u)$ and $a_k(u)$, or the noise $\tilde{n}_c(u)$ and $\tilde{n}_s(u)$ orthogonality.

In the previous example, the product of only two integrals was considered. When considering the $\Pi^N$ detector, N such integrals will be multiplied. Then two main situations apply:

If N is odd the expectation of a product of N Gaussian variables is zero.

If N is even a mathematical theorem shows that $$E\left\{\prod_{j=1}^{2n}X_j\right\} = \sum_{A\in\mathcal{A}}\prod_{\{i,j\}\in A}\rho_{ij} \text{ and } \rho_{ij}=E\{X_iX_j\} \quad (\text{eq 1})$$

where $X_i$ represents a Gaussian variable equal to $$\frac{1}{T_{int}}\int_0^{T_{int}}\tilde{n}_{c/s}(u)\times a_i(u-\Delta\tau)du,$$

and S is the collection of all N $S=\{X_i\}_{i\in[1:N]}$.

A represents a collection of pair-wise disjoint and non-empty subsets of S whose union is S.

Let A be a partition of $\{1, 2, \ldots, 2N\}$. A is called a pair partition if each set $A\in\mathcal{A}$ has exactly two elements. In order to illustrate the previous theorem the case where N=4 can be shown:

$$E\{X_1X_2X_3X_4\}=\rho_{12}\cdot\rho_{34}+\rho_{13}\cdot\rho_{24}+\rho_{14}\cdot\rho_{23} \quad (\text{eq 2})$$

Equations (eq 1) and (eq 2) show in that way that the expectation of the product of N Gaussian variables can be decomposed in a sum of products for the elementary expectations involving pairs of Gaussian variables. Since it was previously shown that due to the code orthogonality and noise independence properties the corresponding products were most of the time zero it is expected that the corresponding expectation and consequently the stochastic contribution to the $\Pi^N$ detectors rapidly vanish when N is large.

In order to compare the advantage of the proposed invention it is also proposed to compare the corresponding performance with more conventional detectors based on matched filters. These performances will be measured with the SNR ratio of the detector, D, defined as:

$$SNR_D = \frac{[E\{D\}]^2}{\text{var}\{D\}}$$

Two cases of matched filters will be considered:

The first case applies when the same symbol $d(j)$ is transmitted on all N channels. One conventional operator would consist in correlating the received signal with the sum of the N replicas (equivalent to summing the correlator outputs) and to add the squares of the corresponding in- and quadrature summed correlator outputs. The corresponding detector is called $D_{\Sigma_c}$ (sub-script c, standing for coherent).

$$D_{\Sigma_c}(j) = \left(\sum_{k=1}^{N}A_{k,In}(j)\right)^2 + \left(\sum_{k=1}^{N}A_{k,Quad}(j)\right)^2$$

Here again the deterministic part of the corresponding detector is evaluated. For this it is supposed that the cross-correlations $R_{a_k,a_n}(0)$ are equal to zero for k≠n. In that case it appears that the deterministic part of $D_{\Sigma_c}$ is (ignoring again the noise contribution):

$$D_{\Sigma_c}(j) =$$

$$\left\{ d(j) \left[ \sqrt{P_N} \sum_{k=1}^{N} \{R_{a_k,a_k}(0)\} \times \cos(\pi \Delta f T_{int} - \Delta\varphi) \times \mathrm{sinc}(\Delta f T_{int}) \right] \right\}^2 +$$

$$\left\{ d(j) \left[ \sqrt{P_N} \sum_{k=1}^{N} \{R_{a_k,a_k}(0)\} \times \sin(\pi \Delta f T_{int} - \Delta\varphi) \times \mathrm{sinc}(\Delta f T_{int}) \right] \right\}^2$$

$$D_{\Sigma_c}(j) = \left[ \sqrt{P_N} N \mathrm{sinc}(\Delta f T_{int}) \right]^2 \cdot$$

$$[\cos^2(\pi \Delta f T_{int} - \Delta\varphi) + \sin^2(\pi \Delta f T_{int} - \Delta\varphi)] = P_N N^2 \mathrm{sinc}^2(\Delta f T_{int})$$

When comparing the analytical expressions for the $D_{\Pi_c}$ and $D_{\Sigma_c}$ detectors some differences can be highlighted: First the effect of the Doppler mismatch, $\Delta f$, will degrade less the $D_{\Sigma_c}$ output value than the $D_{\Pi_c}$ detector one, since the sin c function, with the Doppler mismatch $\Delta f$ as argument, is squared for the conventional detector, while it is at power of N for the $D_{\Pi_c}$ detector. Therefore it sounds that the conventional matched $D_{\Sigma_c}$ detector is more efficient that the new proposed one, $D_{\Pi_c}$. However, for applications where the corresponding Doppler mismatch is not that high the corresponding effects for Doppler mismatch are limited. This is the case of terrestrial applications with terrestrial transmitters (beacons, base transmit station), like for in-door applications.

For $P_N<1$, $N^2 P_N$ (applicable for $D_{\Sigma_c}$) is larger than $P_N^{N/2}$ (applicable for $D_{\Pi_c}$) and the output of the $D_{\Sigma_c}$ becomes larger than this of the $D_{\Pi_c}$ one. Now for P>1 the $D_{\Pi_c}$ output will exceed the $D_{\Sigma_c}$ one for some values of N that depend on P. So the situation is inverse and therefore no general advantage w.r.t. to the term $N^2 P_N$ (applicable for $D_{\Sigma_c}$) or $P_N^{N/2}$ (applicable for $D_{\Pi_c}$) can be stated (pros and cons depend on the P and N configurations).

Additionally, it can be shown with simulations that the stochastic contribution is more reduced in the $D_{\Pi_c}$ detector than in the $D_{\Sigma_c}$ due to the aforementioned properties for code orthogonality and noise independence. This is especially true when N is odd. This reduction of the stochastic term for the $D_{\Sigma_c}$ with respect to the $D_{\Sigma_c}$ will also compensate the differences in the deterministic term previously highlighted.

Finally, the $D_{\Sigma_c}$ detector applies when the same symbol is modulated on all N components of the CDMA signal, while for the $D_{\Pi_c}$, N different symbols can be modulated. Even if one symbol has to be sacrificed (when considering the second option used to guarantee a constant value of the detector output), the overall data throughput for the signal applicable for the $D_{\Pi_c}$ detector will be larger than this used for the $D_{\Sigma_c}$ detector, especially when N is large (example of QAM-16 with N=16 different components).

The second possible detector used for comparison applies when N different symbols $d_n(t)$ are transmitted on the N channels. Here it is not possible to add the corresponding correlator outputs directly. It is necessary to first square them in order to suppress the effect of the symbol flips. The corresponding detector is called $D_{\Sigma_{nc}}$ nc, standing for non-coherent).

$$D_{\Sigma_{NC}}(j) = \sum_{k=1}^{N} (A_{k,In}(j))^2 + \sum_{k=1}^{N} (A_{k,Quad}(j))^2$$

Here again the deterministic part of the corresponding detector is evaluated. The same hypotheses as for the $D_{\Sigma_c}$ detector are applied here:

$$D_{\Sigma_{nc}}(j) = \sum_{k=1}^{N} \{d(j)\sqrt{P_N} R_{a_k,a_k}(0) \times \cos(\pi \Delta f T_{int} - \Delta\varphi) \times \mathrm{sinc}(\Delta f T_{int})\}^2 +$$

$$\sum_{k=1}^{N} \{d(j)\sqrt{P_N} R_{a_k,a_k}(0) \times \sin(\pi \Delta f T_{int} - \Delta\varphi) \times \mathrm{sinc}(\Delta f T_{int})\}^2$$

$$D_{\Sigma_{nc}}(j) = \left(\sqrt{P_N}\right)^2 \left[ \sum_{k=1}^{N} \{\cos(\pi \Delta f T_{int} - \Delta\varphi)^2 + \sum_{k=1}^{N} \{\sin(\pi \Delta f T_{int} - \Delta\varphi)\}^2 \right] \times$$

$$\mathrm{sinc}^2(\Delta f T_{int})$$

$$D_{\Sigma_{nc}}(j) = P_N \times N \times \mathrm{sinc}^2(\Delta f T_{int})$$

When compared to the $D_{\Sigma_c}$ detector output it appears that the $D_{\Sigma_{nc}}$ output is N times smaller, but of course the symbol rate is N times larger. When comparing the $D_{\Sigma_{nc}}$ output with the $D_{\Pi_c}$ one, similar statements as those presented to the $D_{\Sigma_c}$ output can be proposed.

The Doppler mismatch dependency might degrade more the $D_{\Pi_c}$ detector output than the $D_{\Sigma_{nc}}$ one but again for applications with low Doppler (terrestrial one, Indoor, etc. . . . ) this difference should not be significant.

For $P_N<1$, $N P_N$ (applicable for $D_{\Sigma_{nc}}$) is larger than $P_N^{N/2}$ (applicable for $D_{\Pi_c}$) and the output of the $D_{\Sigma_{nc}}$ becomes larger than this of the $D_{\Pi_c}$ one. Now for P>1 the $D_{\Pi_c}$ output will exceed the $D_{\Sigma_{nc}}$ for some values of N that depend on P (those values are smaller than in the $D_{\Sigma_c}$ case). Again, no general advantage w.r.t. to the term $N P_N$ (applicable for $D_{\Sigma_{nc}}$) or $P_N^{N/2}$ (applicable for $D_{\Pi_c}$) can be stated.

As for the $D_{\Sigma_c}$ it can be shown with simulations that the stochastic contribution is more reduced in the $D_{\Pi_c}$ detector than in the $D_{\Sigma_{nc}}$ to the aforementioned properties of code orthogonality and noise independence.

Now, the $D_{\Sigma_{nc}}$ has a bit rate larger than this of the $D_{\Pi_c}$ detector since for the $D_{\Sigma_{nc}}$ is not necessary to sacrifice one data symbol over N. Of course for large number of components (like a QAM-16 with N=16 components) this difference becomes minimal.

As a conclusion the detection performances of the $D_{\Pi_c}$ have to be compared with those of the $D_{\Sigma_c}$ and $D_{\Sigma_{nc}}$ when considering not only the absolute value of deterministic part of the detector output but also the effective data (symbol) rate and also the contribution from the stochastic part which vanishes more for the $D_{\Pi_c}$ due to the properties of code orthogonality and noise independence.

The former qualitative, semi-quantitative assessments were derived for a $\Pi^N$ detector evaluated over single code epoch (J=1). Now a second significant benefit of the $\Pi$ detector is that it is possible to cumulate successive detector outputs over many epochs since the symbol sign changes have been suppressed thanks to the condition between the symbols (their product has always the same value). Therefore it is possible to integrate for many symbol periods, even many seconds, without a problem of symbol-bit edges, or even small frequency errors.

The former assessments were proposed when the condition $$\left( \prod_{n=1}^{N} d_n(j) \right) = 1$$

applies to symbols corresponding to the same spreading code epoch, j. Similar assessments could be derived when considering the situation when the constraint, $$\left\{\prod_{n_1 \in E_1} d_{n_1}(j_1)\right\} \cdot \left\{\prod_{n_2 \in E_2} d_{n_2}(j_2)\right\} = C^{st},$$

applies between symbols at two different spreading code epochs, $j_1$ and $j_2$. This type of detector applying this alternate condition enables to determine the phase variations between epoch $j_1$ and $j_2$. This detector could consequently be used as discriminator for the Phase Lock Loops or Frequency Lock Loops.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a CDMA signal s(t) comprising N components, the method comprises the acts of:

assigning to each of the N components one unique spreading sequence $a_n$ selected from a set of M spreading sequences with M≥N and modulating symbols $d_n$ of each component on the assigned unique spreading sequence $a_n$; and combining the N symbols $d_n$ each being spread with its own unique spreading sequence $a_n$ to form a CDMA signal s(t), wherein the assigned spreading sequences $a_n$ are selected such that all selected pairs within the set of N spreading sequences are orthogonal or very close to orthogonal so that cross-correlation components between all spreading sequences $a_n$ are close to zero or zero: $R_{a_k,a_n}(\Delta\tau) \cong 0$ with the expression for the cross-correlation being $$R_{a_k,a_n}(\Delta\tau) = \frac{1}{T_{int}} \int_0^{T_{int}} a_k(t) a_n(t - \Delta\tau) dt,$$

and wherein the symbols $d_n$ of the components are selected such that $$\left\{\prod_{n_1 \in E_1} d_{n_1}(j_1)\right\} \cdot \left\{\prod_{n_2 \in E_2} d_{n_2}(j_2)\right\} = C^{st}$$

and $E_1 \cup E_2 = [1, 2, \ldots, k, \ldots, N]$, wherein $C^{st}$ is defined as a constant, wherein $E_1$ contains $N_1$ distinct integer indexes, $E_2$ contains $N_2$ distinct integer indexes, being also distinct to the $N_1$ indexes with $N_1+N_2=N$, and wherein $j_1$ and $j_2$ correspond to two indexes for two code epochs of duration $T_{int}$ corresponding to the symbol period $T_{symbol}$, and wherein all modulated components have the same symbol duration.

2. The method of claim 1, wherein $j_1=j_2=j$ and the N symbols $d_n(j)$ of the components are selected such that the condition becomes $$\left(\prod_{n=1}^{N} d_n(j)\right) = C^{st}$$

where $C^{st}$ designates a constant which is either +1 or −1 for binary symbols.

3. The method of claim 1, wherein an even number N of spreading sequences $a_n$ is provided, wherein N/(2×K) symbols $d_n(j)$ have to be transmitted and each symbol is always modulated on (2×K) different spreading sequences such that $$\left(\prod_{n=1}^{N} d_n(j)\right) = 1,$$

wherein K=1, 2, 3, . . . and N/2 is dividable by K.

4. The method of claim 1, wherein a number N of spreading sequences $a_n$ is provided and one of the N symbols $d_n(j)$, taken during the same epoch j, transmits a dummy symbol $d_q(j)$ in such a way that its value is proportional to the product of the N−1 other symbols:

$$\left(\prod_{n=1}^{N} d_n(j)\right) = \left(\prod_{\substack{n=1 \\ n \neq q}}^{N} d_n(j)\right) d_q(t) = C^{st}.$$

$$d_q(j) = C^{st} / \left(\prod_{\substack{n=1 \\ n \neq q}}^{N} d_n(j)\right) = C^{st} \cdot \left(\prod_{\substack{n=1 \\ n \neq q}}^{N} d_n(t)\right),$$

wherein $C^{st}$ is a constant with the value +1 or −1.

5. The method of claim 1, wherein an even number of N spreading sequences $a_n$ is provided and the product of one half of the N symbols, taken at the epoch j, with another half of the N symbols taken at the next epoch (j+1) is a constant:

$$\left\{\prod_{n_1 \in E_1} d_{n_1}(j)\right\} \cdot \left\{\prod_{n_2 \in E_2} d_{n_2}(j+1)\right\} = C^{st}$$

and $E_1 \cup E_2 = [1, 2, \ldots, k, \ldots, N]$, wherein $C^{st}$ is defined as a constant, wherein $E_1$ contains $N_1=N/2$ distinct indexes and $E_2$ contains $N_2=N/2$ distinct indexes, also being distinct from the $N_1$ indexes.

6. The method of claim 1, further comprising the act of:

up-converting the CDMA signal s(t) from a baseband into a transmission band.

7. The method of claim 1, wherein after a certain period of time new unique spreading sequences $a_n$ are selected from the set of M spreading sequences, the newly selected unique spreading sequences $a_n$ are assigned to the N components, and the symbols $d_n$ of each component are modulated on the assigned new unique spreading sequence $a_n$.

8. A method for processing a CDMA signal r(t), the method for processing comprises the following steps:

receiving a CDMA signal r(t) over a duration equal to J+Q spreading code periods, which corresponds to J+Q spreading code epochs;

correlating the CDMA signal r(t) for the spreading code epoch of index $j_1$ with each of $N_1$ spreading sequences and obtaining for each of the $N_1$ complex correlations an In-phase component $A_{k,In}(j_1)$ and a quadrature component $A_{k,Quad}(j_1)$;

correlating the CDMA signal r(t) for the spreading code epoch of index $j_2$, wherein $j_2=j_1+Q$, with each of $N_2$ spreading sequences and obtaining for each of the $N_2$ complex correlations an In-phase component $A_{k,In}(j_2)$ and a quadrature component $A_{k,Quad}(j_2)$;

multiplying the $N=N_1+N_2$ In-phase components $A_{k,In}(j_1)$ and $A_{k,In}(j_2)$ to obtain an output of the N In-phase components $A_{k,In}(j_1)$ and $A_{k,In}(j_2)$;

multiplying the $N=N_1+N_2$ quadrature components $A_{k,Quad}(j_1)$ and $A_{k,Quad}(j_2)$ to obtain an output of the N quadrature components $A_{k,Quad}(j_1)$ and $A_{k,Quad}(j_2)$;

summing the product of the N multiplied In-phase components $A_{k,In}(j_1)$ and $A_{k,In}(j_2)$ and the product of the N multiplied quadrature components $A_{k,Quad}(j_1)$ and $A_{k,Quad}(j_2)$ for obtaining a detector output $D_\Pi(j_2)$ corresponding to the spreading code epoch $j_2$; and repeating the preceding steps for the determination of J successive $D_\Pi(j_2)$ detectors outputs corresponding to J successive index values of $j_2$, summing J successive detector outputs $D_\Pi(j_2)$ corresponding to J successive correlations of the received signal.

9. The method of claim 8, wherein the receiving of a CDMA signal r(t) comprises down-converting the received signal to a baseband for obtaining a baseband representation of the CDMA signal r(t).

10. The method of claim 8, wherein the correlation of the CDMA signal r(t) over a time period corresponding to the $j^{th}$ spreading code epoch with each of the spreading sequences, $a_k$ with index k, is performed according to the following equations:

$$A_{k,In}(j) = \begin{bmatrix} \left\{ \sqrt{P_{Rx,k}} \, d_k(j) R_{a_k,a_k}(\Delta\tau) + \sum_{\substack{n=1 \\ n \neq k}}^{N} \sqrt{P_{Rx,n}} \, d_n(j) R_{a_k,a_n}(\Delta\tau) \right\} \times \\ \cos(\pi \Delta f T_{int} - \Delta\varphi) \times \mathrm{sinc}(\Delta f T_{int}) + \\ \frac{1}{T_{int}} \int_{t_0+j \cdot T_{int}}^{t_0+(j+1) \cdot T_{int}} \tilde{n}_c(t) \times a_k(t-\Delta\tau) \, dt \end{bmatrix}$$

$$A_{k,Quad}(j) = \begin{bmatrix} \left\{ \sqrt{P_{Rx,k}} \, d_k(j) R_{a_k,a_k}(\Delta\tau) + \sum_{\substack{n=1 \\ n \neq k}}^{N} \sqrt{P_{Rx,n}} \, d_n(j) R_{a_k,a_n}(\Delta\tau) \right\} \times \\ \sin(\pi \Delta f T_{int} - \Delta\varphi) \times \mathrm{sinc}(\Delta f T_{int}) + \\ \frac{1}{T_{int}} \int_{t_0+j \cdot T_{int}}^{t_0+(j+1) \cdot T_{int}} \tilde{n}_s(t) \times a_k(t-\Delta\tau) \, dt \end{bmatrix}$$

wherein
k represents the index of the desired component for which both correlations $A_{k,In}(j)$ and $A_{k,Quad}(j)$ are calculated, j is the index of the $j^{th}$ period of time or epoch with a duration equal to the spreading code period or equivalently the symbol, for which both correlations $A_{k,In}$ and $A_{k,Quad}$ are calculated, t is the time variable which belongs to the time interval $t_o+j \cdot T_{int} \leq t \leq t_o+(j+1) \cdot T_{int}$ and $t_o$ is an arbitrary time origin, $P_{Rx,n}$ represent the received power of each signal component of index n, $\Delta\tau$ represents the code offset between the replica and received signal, $\Delta\varphi$ represents the phase offset between the replica and received signal, $\Delta f$ represents the frequency offset—Doppler—between the replica and received signal, $R_{a_k,a_k}(\Delta\tau)$ represents the Auto-Correlation Function between code $a_k$ and code $a_k$ with the expression for the auto-correlation function being $$R_{a_k,a_k}(\Delta\tau) = \frac{1}{T_{int}} \int_0^{T_{int}} a_k(t) a_k(t-\Delta\tau) \, dt,$$

$R_{a_k,a_n}(\Delta\tau)$ represents the Cross-Correlation Function between code $a_k$ and code $a_n$ with the expression for the cross-correlation function being $$R_{a_k,a_n}(\Delta\tau) = \frac{1}{T_{int}} \int_0^{T_{int}} a_k(t) a_n(t-\Delta\tau) \, dt,$$

$T_{int}$ is the coherent integration time equal to the symbol duration, $T_{symbol}$, or spreading code period, $\tilde{n}_c(t)$ and $\tilde{n}_s(t)$ represents the in-phase and quadrature components of the additive noise, wherein it is assumed that the corresponding noise components are Gaussian distributed.

11. A computer program for generating a CDMA signal s(t) comprising N components, the computer program being stored on a non-transitory computer-readable medium, the computer program, when executed by a processor, causes the processor to:

assign to each of the N components one unique spreading sequence $a_n$ selected from a set of M spreading sequences with $M \geq N$;

modulate symbols $d_n$ of each component on the assigned unique spreading sequence $a_n$; and combine the N symbols $d_n$ each being spread with its own unique spreading sequence $a_n$ to a CDMA signal s(t), wherein the assigned spreading sequences $a_n$ are selected such that all selected pairs within the set of N spreading sequences are orthogonal or very close to orthogonal so that cross-correlation components between all spreading sequences $a_n$ are close to zero or zero: $R_{a_k,a_n}(\Delta\tau) \cong 0$ with the expression for the cross-correlation being $$R_{a_k,a_n}(\Delta\tau) = \frac{1}{T_{int}} \int_0^{T_{int}} a_k(t) a_n(t-\Delta\tau) \, dt,$$

and wherein the symbols of the components are selected such that $$\left\{ \prod_{n_1 \in E_1} d_{n_1}(j_1) \right\} \cdot \left\{ \prod_{n_2 \in E_2} d_{n_2}(j_2) \right\} = C^{st}$$

and $E_1 \cup E_2 = [1, 2, \ldots, k, \ldots, N]$, wherein $C^{st}$ is defined as a constant, wherein $E_1$ contains $N_1$ distinct integer indexes, $E_2$ contains $N_2$ distinct integer indexes, being also distinct to the $N_1$ indexes with $N_1+N_2=N$, and wherein $j_1$ and $j_2$ correspond to two indexes for two code epochs of duration $T_{int}$ corresponding to the symbol period $T_{symbol}$, and wherein all modulated components have the same symbol duration.

12. A CDMA signal generator comprising:
assigning and modulating means for assigning to each of N components an unique spreading sequence $a_n$ selected from a set of M spreading sequences with M≥N and for modulating the symbols of each component on the assigned unique spreading sequence $a_n$; and
a combiner configured to combine the N symbols $d_n$ each being spread with its own unique spreading sequence $a_n$ to a CDMA signal s(t),
wherein the assigning and modulating means are configured to select the assigned spreading sequences $a_n$ such that all selected pairs within the set of N spreading sequences are orthogonal or very close to orthogonal so that cross-correlation components between all spreading sequences $a_n$ are zero or close to zero: $R_{a_k,a_n}(\Delta\tau) \cong 0$ with the expression for the cross-correlation being, $$R_{a_k,a_n}(\Delta\tau) = \frac{1}{T_{int}} \int_0^{T_{int}} a_k(t) a_n(t - \Delta\tau) dt,$$

and
wherein the CDMA signal generator is configured to select the symbols $d_n$ of the components such that $$\left\{\prod_{n_1 \in E_1} d_{n_1}(j_1)\right\} \cdot \left\{\prod_{n_2 \in E_2} d_{n_2}(j_2)\right\} = C^{st}$$

and $E_1 \cup E_2 = [1, 2, \ldots, k, \ldots, N]$,
wherein $C^{st}$ is defined as a constant, wherein $E_1$ contains $N_1$ distinct integer indexes, $E_2$ contains $N_2$ distinct integer indexes, also being distinct to the $N_1$ indexes with $N_1 + N_2 = N$, and wherein $j_1$ and $j_2$ correspond to two indexes for two code epochs of duration $T_{int}$ corresponding to the symbol period $T_{symbol}$, and
wherein all modulated components have the same symbol duration.

13. The generator of claim 12, wherein the assigning and modulating means are part of an integrated circuit.

14. A CDMA signal processor comprising:
a receiver configured to receive a CDMA signal r(t) over a duration equal to J+Q spreading code periods, which corresponds to J+Q spreading code epochs;
at least one correlator configured to correlate the CDMA signal r(t) for the spreading code epoch of index $j_1$ with each of the $N_1$ spreading sequences and obtaining for each of the $N_1$ complex correlations an In-phase component $A_{k,In}(j_1)$ and a quadrature component $A_{k,Quad}(j_1)$ and for correlating the CDMA signal r(t) for the spreading code epoch of index $j_2$ with $j_2 = j_1 + Q$ with each of the $N_2$ spreading sequences and obtaining for each of the $N_2$ complex correlations an In-phase component $A_{k,In}(j_2)$ and a quadrature component $A_{k,Quad}(j_2)$;
a first multiplier configured to multiply the $N = N_1 + N_2$ In-phase components $A_{k,In}(j_1)$ and $A_{k,In}(j_2)$ for obtaining an output of the N multiplied In-phase components $A_{k,In}(j_1)$ and $A_{k,In}(j_2)$;
a second multiplier configured to multiply the $N = N_1 + N_2$ quadrature components $A_{k,Quad}(j_1)$ and $A_{k,Quad}(j_2)$ for obtaining an output of the N multiplied quadrature components $A_{k,Quad}(j_1)$ and $A_{k,Quad}(j_2)$; and
an adder configured to sum a product of the N multiplied In-phase components $A_{k,In}(j_i)$ and $A_{k,In}(j_2)$ and a product of the N multiplied quadrature components $A_{k,Quad}(j_1)$ and $A_{k,Quad}(j_2)$ for obtaining a detector output $D_{\Pi}(j_2)$ corresponding to the spreading code epoch $j_2$,
wherein the processor is configured to determine J successive $D_{\Pi}(j_2)$ detectors outputs corresponding to J successive index values of $j_2$, and
a second adder configured to sum J successive detector outputs $D_{\Pi}(j_2)$ corresponding to J successive correlations of the received signal.

* * * * *